Nov. 28, 1961  D. EVERS ET AL  3,011,007
LEAD-ACID STORAGE BATTERY
Filed Aug. 20, 1959
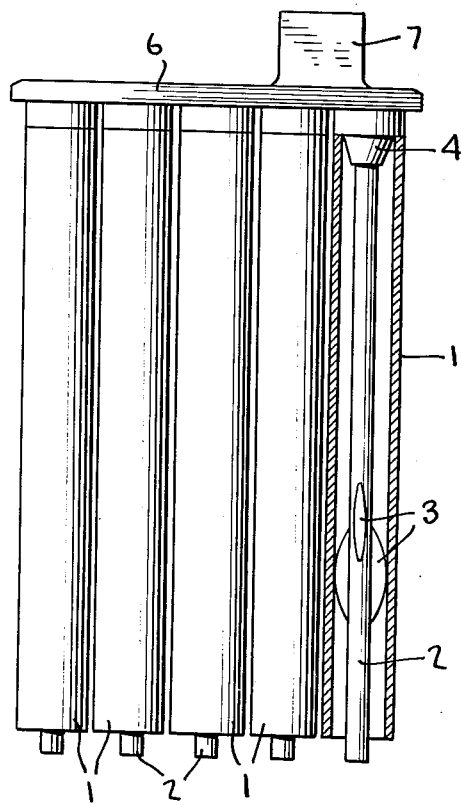
INVENTORS
DIETRICH EVERS
BY HERBERT GUMPRECHT
MANFRED RASCHE
AGENT 3,011,007
LEAD-ACID STORAGE BATTERY
Dietrich Evers, Hagen, Herbert Gumprecht, Volmarstein (Ruhr), and Manfred Rasche, Hagen, Germany, assignors to Accumulatoren-Fabrik Aktiengesellschaft, Hagen, Westphalia, Germany, a corporation of Germany
Filed Aug. 20, 1959, Ser. No. 835,043
Claims priority, application Germany Aug. 21, 1958
1 Claim. (Cl. 136—26)

The present invention relates to lead-acid storage batteries and more particularly to such batteries with positive plates consisting of vertical tubes containing the active material.

It has been proposed to add phosphoric acid to the electrolyte of lead-acid batteries with positive grids or large-surface positive plates. The main purpose of this additive was the prevention of harmful sulfation, another advantage being the solidification of the active mass. This inhibited the active material from being washed out and thus increased the battery life. On the other hand, the phosphoric acid addition reduced the capacity of the storage battery by 10% to 15%.

Phosphoric acid has heretofore not been added to the electrolyte of lead-acid batteries with positive plates consisting of active material-containing tubes because the capacity loss was considered highly disadvantageous and a solidification of the active material seemed unnecessary with the generally used slotted hard rubber tubes for enclosing the material. It has been held that phosphoric acid additions in such batteries were not useful because the active material was securely held in the hard rubber tubes in contrast to the grid plates where the active material is self-supporting.

It is a primary object of the present invention to provide a lead-acid storage battery with positive plates consisting of vertical tubes containing the active material, which makes full use of the advantageous aspects of a phosphoric acid addition to the electrolyte in respect of preventing sulfation and increasing the battery life due to reduction of washing out of the active material without, however, sacrificing the capacity of the battery.

This and other objects are accomplished in accordance with the present invention by using an active material having a porosity of at least about 65%, i.e., a pore volume of 65% of the total mass, preferably about 75%, and enclosing tubes of a microporous material for the active material, the electrolyte, after charging, having a phosphoric acid content of 3 g. to 10 g. per liter, preferably about 5 g./l. The microporous material for the tubes may be a woven or non-woven sheet material of synthetic or glas fibers.

The structure of the lead-acid battery may be conventional and a positive plate, as used with the invention, is schematically illustrated in the single figure of the accompanying drawing.

In the drawing, the microporous tubes of the plate are indicated at 1, the tube at the extreme right of the figure being shown in section. The tubes are mounted in a framework comprising lead spines 2. Spacers 3 which are alternately mounted at right angles to each other, center the tubes about spines 2. The tubes are held by a frusto-conical element 4 at one end of the spines and all spines are connected by lead bar 6 provided with lug 7.

Unexpectedly, the usual capacity loss caused by the addition of phosphoric acid to the electrolyte of lead-acid batteries has been practically completely eliminated by the use of an active material of very high porosity and microporous enveloping tubes having a very small contact area with the active material while presenting a high cross section of passage for the electrolyte.

Taking advantage of the solidification effect of phosphoric acid on the active material, it has been possible to use enclosing tubes of larger mesh size, thus further increasing the effectiveness of the active material and simultaneously saving tube material.

Adding to all of these advantages, it has also been found unexpectedly that the phosphoric acid additive greatly reduces corrosion of the current collector and conductor. Depending on the alloy used for the terminal, the corrosion decreases as much as about 30% to about 50%.

The solidification of the active material by the phosphoric acid also offers the possibility of using finer particles for the production of the active material cores, which further increases the efficiency and capacity of the battery. Thus, instead of using red lead with a major portion of particles between about $15\mu$ and about $20\mu$, as has been the custom, red lead with a major portion of particles between about $4\mu$ and about $10\mu$ can now be used.

The use of microporous tubes has been found advantageous to reduce the contact areas between the tubes and the active material they enclose to a minimum and to increase the passage area for the electrolyte to a maximum. For this purpose, woven and non-woven glass fiber webs or mats, woven synthetic fiber fabrics, microporous rubber, or microporous plastics have been found satisfactory. In contrast to slotted hard rubber tubes, these materials produce notable surface irregularities and fragmentation in the active material cores, which also contributes to the higher efficiency and greater capacity of batteries according to the present invention.

In one embodiment of the invention, the microporous tubes may be made of a non-woven glass fiber web the fibers of which are bonded together with a polyvinylchloride binder or a polystyrene dispersion. According to another embodiment, a woven, knitted, or reticulated synthetic fiber web may be used as tube material, polyvinylchloride, polyester, and acrylic fibers, as well as copolymers or blends of any of these synthetic resins, being useful for this purpose, by way of example. The fibers may be monofilaments or staple fibers.

Preferably, the synthetic resin fibers or the webs produced therefrom are subjected to a heat treatment at a temperature from about 100° C. to about 200° C. which causes them to shrink to the desired final dimensions and imparts to them a higher acid-resistance and resistance to anodic corrosion.

The tubes may be individually produced but they may also be woven together in groups as used in conventional positive plates of this type to obtain the plate pocket.

The invention has also made successful use of tubes of microporous rubber or polyethylene. So-called Tudor tubes consisting of a knitted glass fiber tube surrounded by a perforated or slotted polyvinylchloride tube also belong to the microporous type of tubes because the glass fiber lining assures the microporous structure of the entire tube. Similarly, a microporous knitted or woven glass fiber tube surrounded by a macroporous synthetic fiber net may also be used, in which case the outer net merely serves as a reinforcement to contain the outward pressure of the active mass in the tube.

As an indication of the reduced contact area between the active mass and microporous tubes, the following may be considered:

In slotted hard rubber tubes used in battery plates of this type, the rubber area between slots of 0.3 mm. is about 0.6 mm., i.e., the ratio of opening to material is about 1:3 and the ratio of area of active material covered by the hard rubber to uncovered active material is 2:1. In microporous tubes, the area of tube material covering the active material is much smaller. For instance, the diameter of polyvinylchloride filaments in tubes woven therefrom may be about 0.1 mm. and the mesh size in vertical direction is about 0.15 mm. and in horizontal direction about 0.25 mm., i.e., an average of about 0.2 mm. Therefore, the ratio of active material covering to opening is 1:2 in the latter case.

In other words, the free or uncovered surface of the active material in slotted hard rubber tubes is about 37% of the tube surface. This uncovered surface is correspondinginly increased in microporous tubes. The passage of the acid electrolyte therethrough is further enhanced by the fact that the fibers of synthetic resins have a circular cross section so that capillary forces are created in the tube webs. The uncovered surface of active material in microporous tubes has been as high as 50% to 70% of the tube surface.

With the above indicated slot width of 0.3 mm. and a slot length of 3 mm., slotted tubes have a mesh size of 0.9 sq. mm. The pores of microporous materials normally have a length of 0.175 mm. and a width of 0.2 mm., i.e., an area of 0.035 sq. mm. With the use of the same active material, the mesh size of the microporous tubes used in the present invention may be increased to as much as 0.14 sq. mm., i.e., pores of a length of 0.35 mm. and a width of 0.4 mm. The exact mesh size chosen will depend primarily on the type of active material used but, generally speaking, the usual mesh size of microporous structures may be increased as much as 300% for the purposes of the present invention and the term "microporous," as used throughout the specification and claim, is to be understood in this framework.

Sulfuric acid of the conventional density of 1.20 to 1.28 is used for the acid electrolyte of this invention, a density of 1.20 being normally used for stationary batteries, a density of about 1.24–1.26 for a battery which is used for electrical vehicle traction, and a density of about 1.28 for a starter battery. The indicated amount of phosphoric acid is added to this electrolyte in accordance with this invention.

The active material of the indicated high porosity of at least 65% may be obtained in a variety of ways. In this respect, it should be noted that the porosity of the active material used in conventional plates of this type is already greater than that of active material used in grid plates. The greater the porosity of the active material, the larger the electrical capacity of the plates.

High porosity may be obtained, for instance, by relatively low densification of the active material powder in the tubes. The apparent density of red lead, for instance, is 1.75 g./cc. and a densification to 2.5 g./cc. in the tube would produce a highly porous active material after the read lead has been electrolytically converted into lead dioxide.

In another method, the densification of the red lead dust in the tubes may even exceed 2.5 g./cc. but, before the conversion of the mass into active material takes place, the filled tubes are immersed for five to seven hours in a sulfuric acid bath of a density of about 1.15 to 1.40, preferably 1.25. This causes the chemical decomposition of α:-minium into $PbO_2$ and $PbO$, which, in turn, is converted immediately to $PbSO_4$, causing an increase in volume. The same conversion to lead sulfate takes place with β:-lead powder. During the subsequent formation of $PbO_2$, a high porosity is obtained because of the smaller specific weight of lead dioxide at a constant volume.

High porosity of the active material may also be obtained by mixing the filling mass with inactive materials which are water or acid soluble. When the completed plates are then immersed in water or acid or the active material formation is effected immediately, the soluble inactive materials are washed out of the plate and leave relatively large pores in the active material.

It is also possible to fill the tubes with lead powder masses moistened with water or highly dilute aqueous sulfuric acid solutions, about 10 g. to 60 g. of sulfuric acid being provided per kg. of powder, and then to dry the filled tubes. Drying of the relatively loose mass will leave a high porosity.

Finally, normally filled plates may be discharged once or several times during the formation and after the conversion to $PbO_2$ has taken place. This causes the active material to loosen. This method of producing high porosity active material is particularly applicable when phosphoric acid is added to the electrolyte after the battery has been finished.

Assuming the same volume of powder in the tubes, the surface of the powder particles will increase with a decrease in the particle size of the red lead or lead powder, or mixture thereof, used for the plates. Since the capacity of the plate increases accordingly, the finer the powder, most finely divided active materials are most desirable. However, limits to the size of the active material particles were set in the prior art by the fact that too finely divided material would be washed out of the tubes during operation. Since the phosphoric acid addition solidifies the active material, smaller particle sizes may be used than was heretofore possible.

Lead-acid storage batteries according to the invention may be produced in a variety of ways. For instance, phosphoric acid in the form of a dry phosphate, for instance, lead phosphate, zinc phosphate, or alkali metal phosphates may be added to the active material powder, such as, litharge or red lead or a suitable mixture thereof. The dry mixture can be intimately mixed in any suitable dry mixer, such as a Werner-Pfleiderer mixer, a Simplex mixer, or a ball mill with porcelain balls, for instance. As is known, the battery plate tubes are filled with such lead oxide powders by vibration or shaking, for instance, these oxides being formed electrolytically in the battery by anodic oxidation into lead dioxide, which is the active material. If a lead oxide paste is used to be molded about the current collector and conductor, liquid phosphoric acid may be added to the active material paste. The paste may be any conventional paste and dilute phosphoric acid, for instance, of a density of 1.2 to 1.8, is added, the amount having been established by simple experiments to yield the desired concentration of phosphoric acid in the electrolyte, after the battery is charged. It is also possible to immerse the unfinished multiple-tube plates in a sulfuric acid solution to obtain sulfation, as hereinabove mentioned in connection with the production of highly porous active material. If desired, the sulfuric acid, preferably having a density of 1.15, may contain phosphoric acid, for instance, about 40 g./l. To prevent dilution of the phosphoric acid content in the positive plate during the subsequent formation, the formation acid must contain between 5 g./l. and 10 g./l. of phosphoric acid, preferably about 8 g./l.

Finally, phosphoric acid may be added to the electrolyte after a conventional battery of this type has been put into operation. In this case, it is desirable to add the phosphoric acid slowly between a series of charge and discharge cycles of the battery.

This is done by adding 5 g./l. of phosphoric acid to the electrolyte of an operating battery cell. The battery is then discharged, charged again, and an equal addition of phosphoric acid is made again. When this cycle is repeated three times, the electrolyte usually contains about 5 g./l. of phosphoric acid in the charged state of the battery, the excess phosphoric acid remaining in the positive plate, as hereinbelow explained. If the acid analysis of the cell should show that the electrolyte does not contain the desired minimum amount of phosphoric acid, more phosphoric acid is added in one or more additional cycles.

However the phosphoric acid is added, it is essential that the phosphoric acid content of the positive plate be larger in the charged state of the battery than the phosphoric acid content remaining in the electrolyte and that the latter does not exceed 10 g./l., being at least about 3 g./l. and preferably about 5 g./l. Whether added in a dry or wet state, the total phosphoric acid content in the positive plate after charging is preferably about 25 g. to about 35 g. calculated per liter of electrolyte. With such a phosphoric acid content in the positive plate, the electrolyte will contain less than 10% of phosphoric acid. If the phosphoric acid content in the electrolyte exceeds 10 g./l., a spongy, conductive mass is produced at the positive plate and deposited on the negative plate, which causes short circuits at the plate and thus destroys the cell.

Generally speaking, the active material in the positive plate will contain about three to four times as much phosphoric acid as the electrolyte because the desired phosphoric acid concentration in the electrolyte could otherwise not be maintained. During discharge, a portion of the phosphoric acid moves from the positive plate into the electrolyte and is returned during the charging cycle. If the positive plate would not contain an excess of phosphoric acid, the active material in the positive plate would be loosened during the discharge.

While the lead-acid storage battery of the present invention has been described in connection with certain specific embodiments thereof, it will be clearly understood that modifications and variations may occur to the skilled in the art, particularly after benefiting from the present teaching, without departing from the spirit and scope of the invention as defined in the appended claim.

In a positive plate according to the invention with 19 tubes and a length of 310 mm. of each tube there is inserted 970 g. of red lead with an original density of 1.75 g./cc. This red lead is condensed by vibration to a density of 2.5 g./cc. The positive plate is formed in sulfuric acid with a density of 1.15 g./cc. for 80 hours with a current of 4 amps. After being assembled in a cell 3 of such positive plates with 4 negative grid plates of the conventional type, such negatives being unformed, the charging current of 10 amps. is switched on for 25 hours. Then follows a discharge of the 5 hours rate with 40 amps. during 4 hours. After that a charge with 40 amps. for 3 hours and subsequently for 6 hours with 10 amps. After the first 3 hours charge there is added 5 g. phosphoric acid per liter sulfuric acid. Then follows a discharge in the above mentioned form. During the next charge another addition of phosphoric acid follows. The above mentioned discharge follows.

The addition of phosphoric acid is in the same manner repeated, till—in charged condition—the phosphoric acid content in the free sulfuric acid of the cell becomes stablized at a value of 5–5.5 g./l.

We claim:

A lead-acid storage battery with positive plates consisting of microporous tubes enclosing active material, the major portion thereof having a particle size between about $4\mu$ and about $10\mu$, said active material in said positive plates having a porosity of at least 65%, said battery comprising a sulfuric acid electrolyte which, after charging, has a phosphoric acid content of at least about 3 g./l. and less than 10 g./l., the total phosphoric acid content in the positive plates after charging being about 25 g. to about 35 g. calculated per liter of the electrolyte.

References Cited in the file of this patent

UNITED STATES PATENTS

| | | |
|---|---|---|
| 1,536,064 | Benner et al. | May 5, 1925 |
| 1,559,471 | Strasser | Oct. 27, 1925 |
| 1,748,485 | Kugel | Feb. 25, 1930 |
| 2,305,121 | Wheat | Dec. 15, 1942 |

FOREIGN PATENTS

| | | |
|---|---|---|
| 160,716 | Australia | Jan. 24, 1955 |

OTHER REFERENCES

Lyndon: Storage Battery Engineering, published 1911, page 94.